G. PERKINS.
MACHINE FOR CUTTING PAVING.
APPLICATION FILED SEPT. 26, 1913.
1,090,646.
Patented Mar. 17, 1914.
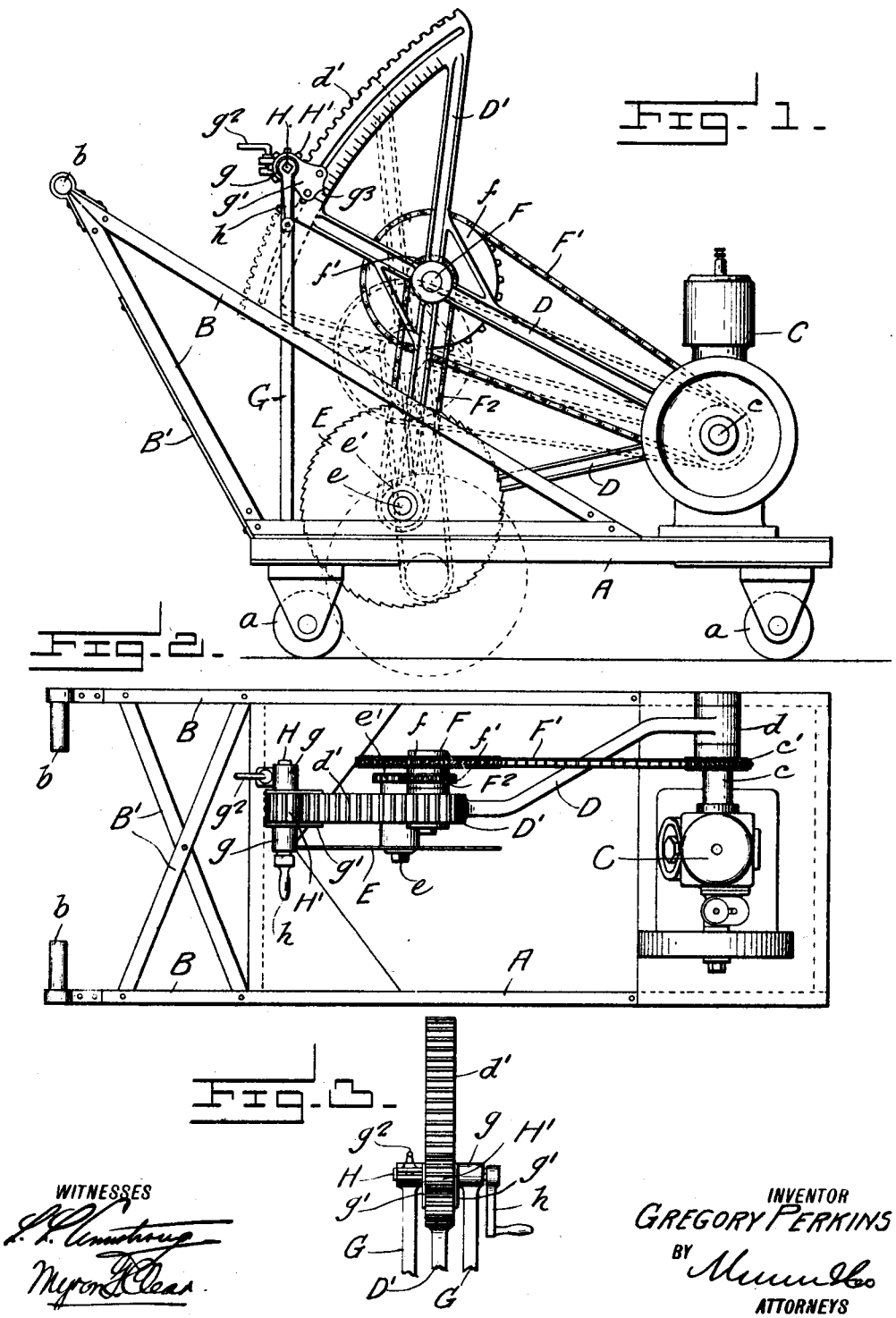
WITNESSES
INVENTOR
GREGORY PERKINS
BY
ATTORNEYS

UNITED STATES PATENT OFFICE.

GREGORY PERKINS, OF LOS ANGELES, CALIFORNIA.

MACHINE FOR CUTTING PAVING.

1,090,646.  Specification of Letters Patent.  Patented Mar. 17, 1914.

Application filed September 26, 1913. Serial No. 791,986.

*To all whom it may concern:*

Be it known that I, GREGORY PERKINS, a citizen of the United States, and a resident of Los Angeles, in the county of Los Angeles and State of California, have invented an Improvement in Machines for Cutting Paving, of which the following is a specification.

My present invention relates to a machine for cutting asphalt and other paving through the use of a power driven circular saw, my object being to provide a machine including means by which to support a circular saw in such manner that it may be adjusted toward and away from the ground and held in selected position for cutting the paving or other material to a desired depth.

In the accompanying drawing which illustrates my invention, Figure 1, is a side elevation. Fig. 2, is a plan view, and Fig. 3, is a rear elevation of the upper portion of the adjusting segment and the gear for actuating and controlling the same.

Referring now to these figures, the frame A of my improved machine is supported upon forward and rear wheels $a$ in the form of rollers and is guided by means of rearwardly and upwardly inclined side handle frames B, at the upper ends of which are laterally inwardly projecting handles $b$, these handle frames being braced by crossed connecting braces B′ as shown in Fig. 2.

Upon the forward portion of the frame A is mounted a motor or other prime mover C, upon the driving shaft $c$ of which is secured a sprocket wheel $c'$. A cutter frame D has its forward portion $d$ journaled also on the shaft $c$ of the motor, forming a fulcrum upon which the rear portion of the frame D may be raised and lowered, said frame supporting at its rear lower portion the shaft $e$ of a cutter in the form of a circular saw E and upon which shaft is also secured a sprocket wheel $e'$. The rear upper portion of the frame D also supports an intermediate shaft F upon which are secured large and small sprocket wheels $f$ and $f'$ respectively, the former of which is connected to the sprocket $c'$ of the driving shaft $c$ by means of a chain F′, and the latter of which is connected to the sprocket wheel $e'$ of the cutter shaft by means of a similar chain F².

The rear upper portion of the cutter frame D is provided with an upwardly and rearwardly projecting extension frame D′ of which an adjusting segment $d'$, the outer surface of which is provided with a rack, and the inner surface of which is calibrated as particularly shown in Fig. 1, forms a part.

In the rear of the cutter frame are a pair of standards G projecting upright from the frame A in spaced relation and upon relatively opposite sides of the plane of the cutter frame, the upper ends of these standards supporting tubular bearings $g$ for a transverse adjusting shaft H, this shaft being provided with a gear wheel H′ between the standards G and in engagement with the outer rack face of the segment $d'$, the relative engagement of gear H′ and the segment being maintained by means of side plates $g'$ projecting from the inner upper ends of the standards G and having inwardly projecting pins engaging the grooved sides of the segment, the said plates $g'$ having pointers $g^3$ coöperating with the inner calibrated edge of the segmental rack $d'$ whereby the adjustment of the cutter frame may be properly calculated and read. At one end, shaft H is provided with a crank $h$ and is arranged to be immovably clamped at its opposite end by means of a clamping screw $g^2$ controlling one of the bearings $g$ which is in the form of a split sleeve. Thus the frame A may be readily moved and guided across the surface of the ground by means of the handles $b$, and when moved to the proper position, the motor C or other prime mover is started for the purpose of transmitting motion to the saw cutter E through the connections before mentioned including the sprocket chains F′ and F². It is then simply necessary to relieve the clamping pressure upon the adjusting shaft H by loosening the clamping screw $g^2$ and the crank $h$ may be grasped and rotated in order to cause similar movement of the gear H′ which engages the rack face of the segment $d'$ and thus lowers the extension frame D′ and the cutter frame D so as to lower the saw cutter E into engagement with the surface of the ground or another object beneath the supporting frame A. In this way the depth of cut may be readily controlled and the cutter frame locked in adjusted position by tightening the clamping screw $g^2$ so as to rigidly hold the adjusting shaft H against movement.

I claim:—

1. A machine of the character described comprising a roller supported frame, a motor and the like mounted upon the forward portion of the machine and having a laterally projected driving shaft, a cutter frame the forward portion of which is fulcrumed upon the driving shaft, a cutter shaft supported in the lower rear portion of the cutter frame, a circular saw secured upon the cutter shaft, connections between the cutter shaft and the said driving shaft and including an intermediate shaft journaled through the upper rear portion of the cutter frame, handles for moving and guiding the main frame, an extension frame projecting from the upper rear portion of the cutter frame and provided with a segmental rack, and means engaging the said rack for adjusting the main frame and its saw toward and away from the surface of the ground.

2. In a machine of the character described the combination of a vertically adjustable cutter frame having a supporting fulcrum at its forward end and a rear circular cutter, and provided with a segmental rack, an adjusting shaft, standards having bearings for the said adjusting shaft and one of which bearings is in the form of a split sleeve, a handle for rotating the adjusting shaft, a clamping screw engaging the split sleeve for locking the adjusting shaft, and a gear carried by the adjusting shaft and in mesh with the segmental rack, all for the purpose described.

3. In a machine of the character described, the combination of a vertically adjustable cutter frame having a grooved segmental rack, a circular saw carried by the cutter frame, a transverse adjusting shaft having a gear in engagement with the segmental rack and provided with a handle, standards having bearings at their upper ends for the adjusting shaft and one of which bearings is in the form of a split sleeve, guide plates carried by the said bearings and provided with members engaging the grooves of the rack whereby to hold the rack and gear in engagement, and a clamping screw for clamping the portions of the split sleeve whereby to lock the adjusting shaft and cutter frame in desired adjustment.

4. In a machine of the character described, the combination of a vertically adjustable cutter frame having a supporting fulcrum at one end and a circular cutter at its opposite end and provided with an extension located substantially above the cutter and having a segmental rack, an adjusting shaft provided with a gear in engagement with the rack and having means whereby it may be rotated, and a clamp engaging the said adjusting shaft in order to lock the same and the cutter frame in adjusted position, all for the purpose described.

GREGORY PERKINS.

Witnesses:
PERRY R. TURPIN,
GEO. T. SHINNICK.